United States Patent
Welle et al.

(10) Patent No.: US 7,333,900 B2
(45) Date of Patent: Feb. 19, 2008

(54) AUTOMATIC PARASITIC ECHO STORAGE

(75) Inventors: Roland Welle, Oberwolfach (DE); Karl Griessbaum, Muehlenbach (DE); Josef Fehrenbach, Haslach (DE); Thomas Deck, Wolfach (DE); Martin Gaiser, Alpirsbach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 11/202,007

(22) Filed: Aug. 11, 2005

(65) Prior Publication Data

US 2006/0052954 A1    Mar. 9, 2006

Related U.S. Application Data

(60) Provisional application No. 60/601,929, filed on Aug. 16, 2004.

(51) Int. Cl.
*G01F 17/00* (2006.01)
*G01F 23/00* (2006.01)

(52) U.S. Cl. .................................................. 702/55

(58) Field of Classification Search ................ 702/45, 702/50, 55, 158, 159
See application file for complete search history.

(56) References Cited

U.S. PATENT DOCUMENTS

| | | | | |
|---|---|---|---|---|
| 5,157,639 | A | 10/1992 | Leszczynski | 367/99 |
| 5,323,361 | A | 6/1994 | Elle et al. | 367/98 |
| 5,587,969 | A | 12/1996 | Kroemer et al. | 367/99 |
| 5,822,275 | A | 10/1998 | Michalski | 367/99 |
| 6,684,919 | B2 * | 2/2004 | Gaiser | 141/95 |
| 7,073,379 | B2 * | 7/2006 | Schroth et al. | 73/290 V |
| 7,111,509 | B2 * | 9/2006 | Laun | 73/290 V |

FOREIGN PATENT DOCUMENTS

| | | |
|---|---|---|
| DE | 3337690 A1 | 4/1985 |
| DE | 4232346 A1 | 3/1994 |
| DE | 4234300 A1 | 4/1994 |
| DE | 4407369 A1 | 9/1995 |
| EP | 0689679 | 1/1996 |
| EP | 0770886 A1 | 5/1997 |
| EP | 0573034 B1 | 7/1998 |
| EP | 1 628 119 * | 2/2006 |

OTHER PUBLICATIONS

M. Skolnik, "Introduction to Radar Systems", $2^{nd}$ Edition, 1980, McGraw-Hill, pp. 3.24-3.31.
Peter Devine, "Radar Level Measurement-The Users Guide", VEGA Controlls Ltd., 2000, ISBN 0-9538920-0-X., pp. 68-69.

* cited by examiner

*Primary Examiner*—Michael Nghiem
(74) *Attorney, Agent, or Firm*—Fay Kaplun & Marcin, LLP

(57) ABSTRACT

Described is a method for automatically initiating an update of a parasitic echo storage device in a fill level meter operating according to a runtime method. In this method individual echoes of echo curves of different ages are allocated, according to their typical echo characteristics, to global echo groups so that subsequently, after examining the behaviour over time of the echoes of the respective global echo curves, it can be judged whether the echoes of the respective global echo curves are useful echoes or parasitic echoes. Starting from this classification, the parasitic echo storage device is then updated with the oldest echoes of the corresponding global echo groups. Apart from the method for updating a parasitic echo storage device described is also an evaluation device for implementing the method as well as to a computer program and a computer program product for carrying out the method.

29 Claims, 13 Drawing Sheets

|  | | ... | Penultimate echo curve | | Last echo curve | | Present echo curve | |
|---|---|---|---|---|---|---|---|---|

| Echo index | Echo age | Echo location | Echo amplitude |
|---|---|---|---|
| A | 5 | 17 | 82 |
| B | 5 | 123 | 58 |
| C | 4 | 18 | 83 |
| D | 4 | 120 | 61 |
| E | 3 | 16 | 82 |
| F | 3 | 114 | 67 |
| G | 2 | 16 | 82 |
| H | 2 | 100 | 73 |
| I | 1 | 17 | 81 |
| J | 1 | 86 | 77 |
| K | 0 | 17 | 82 |
| L | 0 | 72 | 80 |

Fig.8

Eval. Number = age difference * location difference * amplitude difference

| | A | B | C | D | E | F | G | H | I | J | K | L |
|---|---|---|---|---|---|---|---|---|---|---|---|---|
| A | ▨ | ▨ | s.o. | s.o. | s.o. | s.o. | s.o. | s.o. | s.o. | s.o. | s.o. | s.o. |
| B | ▨ | ▨ | s.o. | s.o. | s.o. | s.o. | s.o. | s.o. | s.o. | s.o. | s.o. | s.o. |
| C | 1 | 2652 | ▨ | ▨ | s.o. | s.o. | s.o. | s.o. | s.o. | s.o. | s.o. | s.o. |
| D | 2163 | 9 | ▨ | ▨ | s.o. | s.o. | s.o. | s.o. | s.o. | s.o. | s.o. | s.o. |
| E | 2 | 5172 | 2 | 2184 | ▨ | ▨ | s.o. | s.o. | s.o. | s.o. | s.o. | s.o. |
| F | 2910 | 162 | 1536 | 36 | ▨ | ▨ | s.o. | s.o. | s.o. | s.o. | s.o. | s.o. |
| G | 3 | 7758 | 4 | 4368 | 1 | 1470 | ▨ | ▨ | s.o. | s.o. | s.o. | s.o. |
| H | 2241 | 1035 | 1980 | 880 | 756 | 84 | ▨ | ▨ | s.o. | s.o. | s.o. | s.o. |
| I | 4 | 9752 | 6 | 6180 | 2 | 2716 | 1 | 664 | ▨ | ▨ | s.o. | s.o. |
| J | 1380 | 2812 | 1224 | 1632 | 700 | 560 | 350 | 350 | ▨ | ▨ | s.o. | s.o. |
| K | 5 | 12720 | 4 | 8652 | 3 | 4365 | 2 | 1494 | 1 | 345 | ▨ | ▨ |
| L | 550 | 5610 | 648 | 3648 | 336 | 1755 | 224 | 392 | 55 | 42 | ▨ | ▨ |

Fig.10

| Global echo group no. I | | |
|---|---|---|
| Echo age | Echo location | Echo amplitude |
| 50 | 17 | 81 |
| 49 | 16 | 80 |
| 48 | 17 | 82 |
| 47 | 17 | 79 |
| 45 | 19 | 81 |
| 44 | 17 | 82 |
| 43 | 16 | 82 |
| ... | ... | ... |
| ... | ... | ... |
| ... | ... | ... |
| 3 | 16 | 82 |
| 2 | 16 | 82 |
| 1 | 17 | 81 |
| 0 | 17 | 82 |

| Global echo group no. II | | |
|---|---|---|
| Echo age | Echo location | Echo amplitude |
| 50 | 125 | 51 |
| 49 | 125 | 52 |
| 48 | 125 | 51 |
| 47 | 123 | 53 |
| 45 | 120 | 57 |
| 44 | 120 | 56 |
| 43 | 120 | 57 |
| ... | ... | ... |
| ... | ... | ... |
| ... | ... | ... |
| 3 | 114 | 67 |
| 2 | 100 | 73 |
| 1 | 86 | 77 |
| 0 | 72 | 80 |

| Global echo group no. III | | |
|---|---|---|
| Echo age | Echo location | Echo amplitude |
| ... | ... | ... |

Fig.11

| False echo position | False echo amplitude |
|---|---|
| 16.82 | 81.27 |
| ... | ... |
| ... | ... |
| ... | ... |
| ... | ... |
| ... | ... |
| ... | ... |
| ... | ... |

AUTOMATIC PARASITIC ECHO STORAGE

PRIORITY CLAIM

This application claims the benefit of the filing date of U.S. Provisional Patent Application No. 60/601,929 filed Aug. 16, 2004, the disclosure of which is hereby incorporated herein by reference.

FIELD OF THE INVENTION

The present invention generally relates to a method for initiating and continuously updating a parasitic echo storage device of a fill level meter, for example an ultrasound or radar fill level meter, which operates according to a runtime method. In particular, the invention relates to a method for updating the parasitic echo storage, in which method echoes from echo curves of different ages are examined and grouped in relation to corresponding characteristic quantities, and in which method subsequently the parasitic echo storage device is updated by evaluation of the grouped echoes.

Furthermore, the invention relates to an evaluation device for performing the described method according to the invention, in particular for updating the parasitic echo storage, in which method the evaluation device examines and groups echoes from echo curves of different ages in relation to corresponding characteristic quantities of the individual echoes, and wherein the evaluation unit subsequently updates the parasitic echo storage device by evaluation of the grouped echoes.

Moreover, the invention relates to a computer program for implementing the method according to the invention in a fill level meter or in an evaluation device according to the invention as well as to a corresponding computer program product. Such a computer program product can be any computer-readable medium such as for example a CD-ROM, a diskette or a removable hard disk, or a computer program that can be loaded by a server.

In the context of the present invention the term "echo" generally refers to a range around a local maximum in a fill level envelope curve, which range exceeds a freely selectable threshold value. The term "echo characteristics" or "echo data" refers to data generated by an analog-digital converter by scanning the fill level envelope curve, for example comprising the dimensions of location, time, amplitude or pressure, to mention but a few, which data represent the individual echoes of the fill level envelope curve at discrete points in time.

In the context of the present invention the term "fill level meters operating according to the runtime method" covers ultrasound fill level meters and radar fill level meters, wherein in particular fill level meters which operate according to the pulse-runtime method and fill level meters which operate according to the FMCW (Frequency Modulation Continuous Wave) method form part of radar fill level meters. Furthermore, in the context of the present invention, the term "runtime-based fill level meters" also includes devices which operate according to the principle of the guided microwave, as well as any other devices which scan a reflected echo signal, in other words which generate a fill level envelope curve.

TECHNOLOGICAL BACKGROUND

Fill level meters which operate according to the pulse-runtime method, which scan a reflected echo signal, generate a set of information for each echo in the fill level envelope curve out of the scanned echo signal. The act of generating an envelope curve from received echo signals is sufficiently known so that this technique requires no further explanation (see for example DE 44 07 369 C2; M. Skolnik, "Introduction to Radar Systems", 2nd edition, 1980, McGraw-Hill; title: Peter Devine, "Radar level measurement—the users guide", VEGA Controlls Ltd., 2000, ISBN 0-9538920-0-X).

In fill level sensors operating according to the pulse-runtime method, short electromagnetic or acoustic pulses are emitted in a direction of a top surface of bulk material. Subsequently, the sensor records the echo signals reflected by the bulk material and by fixtures built into the container, and, from this, derives the respective fill level, taking into account the pulse propagation speed.

In this method the fill level is determined from a particular echo which can be detected in the fill level envelope curve as being representative of the fill level. In this arrangement the fill level envelope curve is scanned by an analog-digital converter, as a result of which the received fill level envelope curve is provided to a microprocessor or microcontroller in digital form for further processing. However, the received fill level envelope curve not only comprises the fill level echo which is representative for the present fill level and which, in the present document, is referred to as the useful echo, but furthermore it often also comprises parasitic echoes, which are for example caused by multiple reflections or by reflections from fixtures built into containers.

In order to only detect the real fill level echo as such in such a fill level envelope curve, or rather to filter out any undesirable disturbance reflections, often pre-processing of the fill level envelope curve becomes necessary. In this pre-processing of the fill level envelope curve the echoes are processed using one-dimensional or multi-dimensional signal processing methods, for example image processing methods such as filtering, averaging, selection and classification. The fill level envelope curve prepared in this way is then examined and analysed for echoes that are representative of the bulk material, or rather is examined and analysed for disturbance reflections, and is analysed. By means of the echoes that have been prepared in this way and that comprise, for example, data relating to location, amplitude and width of the echoes, a decision can then be made as to which echo is representative of the true fill level and which echo is not. If an echo is detected as being representative of the present fill level, then the location of the analysed echo corresponds to the sought fill level value.

Since, as has already been explained, any fill level envelope curve received always also can comprise parasitic echoes, these parasitic echoes have to be safely detected to prevent mistakenly determining the fill level from such an echo. A known criterion to assess whether any echo is a fill level echo or a parasitic echo consists of always using the echo with the highest amplitude as the fill level echo. However, this criterion has to be assessed as being relatively unsafe, since, for example, a source of disturbance in the signal propagation path, which source is located closer to the receiver of the fill level meter than is the actual fill level, as a rule will return a stronger echo than does the fill level itself. This criterion should therefore not be used on its own but always in combination with other conditions.

From DE 42 23 346 A1 an arrangement and a method for non-contacting distance measuring using pulse echo signals is known. This arrangement compares a pulse echo signal for more precise determination of the signal run times with signal samples stored in a neural network. The aim is in particular to precisely determine the signal run time even in those cases where strong parasitic echo signals are superimposed on the pulse echo signal. Using parallel data processing techniques and associative comparison of the received signals with learned samples that are stored in the neural network, it is possible to regenerate the hidden information and thus determine correct fill level data. With the use of neural associative signal processing, complex holistic evaluation of the pulse echo profile is possible. In this technique the measuring distance itself can be used as an intrinsic reference element in that compensation values are derived from existing parasitic echoes.

Furthermore, from DE 42 34 300 A1 a fill level metering method for direct determination of the useful echo without the use of a parasitic echo storage device is known, in which method the temporal shift of the useful echo, which temporal shift is caused by the changing signal run time occurring during filling or emptying of a container, is recorded, and this criterion is evaluated so as to make it possible to differentiate between the useful echo and parasitic echoes. In other words, in this method, for the purpose of differentiating between a useful echo and a parasitic echo, a check is made whether successive signal courses contain echo pulses which continuously shift in time. That continuously shifting echo that is located closest is then identified as the useful echo. The underlying idea of the known method resulting from this is that, with reflection from the internal wall of the container, signal run times are stable over time so that the position of such noise pulses is unchanged, even in repeated readings, within the receive order. However, normally this temporal positional stability within the receive profile also applies to the useful echo reflected directly from the top surface of the bulk material.

Other methods of fill level detection use echo ratios received in the past, and compare them individually with the echoes of the presently received fill level envelope curve. In these methods the received echoes of an already received fill level envelope curve are archived in a storage device so that these echoes can subsequently be compared individually with the data from a subsequent fill level envelope curve. For example, from EP 0 689 679 B1 a method is known which relates, after forming a difference value, the presently received echoes to the echoes already received in the past, and from it, using a fuzzy evaluation unit, calculates a probability at which the echo is a fill level echo. This approach is associated with problems not only because this method is only suitable for filtering out multiple echoes, but also because the method disclosed in EP 0 689 679 B1 only makes it possible to compare echoes at two points in time.

Moreover, for example, from DE 33 37 690 a method is known in which, during a teach-in phase, the positions of parasitic echoes can be archived manually in the storage of the sensor. Setting up this parasitic echo storage device can take place by measuring the empty fill level container or by manual entry of discrete parasitic echo positions by the user. After completion of the teach-in phase, the echoes received in a curve are compared with the entries in the parasitic echo storage device. Subsequently, the sensor software no longer regards known parasitic echoes as possible useful echoes.

Furthermore, from U.S. Pat. No. 5,157,639 a method is known which, according to a classification of the existing echoes into useful echoes and parasitic echoes, archives in the storage device of the sensor the information determined in relation to the parasitic echoes. In the procedure described therein, either the nearest echo or the echo with the highest amplitude is declared to be the useful echo. All other echoes detected in the echo curve are thus considered to be parasitic echoes and are archived in the parasitic echo storage device.

The above-mentioned methods share a common factor in that they have certain weaknesses in relation to their practical applicability. For example, the classical parasitic echo storage described in DE 33 37 690 requires a teach-in cycle initiated by the user. In practical application the user is thus forced to manually enter the information relating to the parasitic echoes returned by the container, or at least is forced to initiate a self-teach cycle when the container is empty.

In contrast to this, the method for automatic parasitic echo storage presented in U.S. Pat. No. 5,157,639 is not in a position to perform a reliable classification into useful echoes and parasitic echoes. From practical application, configurations are known in which a relatively large source of disturbance is present directly in front of the aerial of the sensor, whereby the described method would already reach its performance limits. Moreover, the method presented provides no information as to when which criterion is to be used when classifying existing echoes into useful echoes and parasitic echoes.

There is a further problem in that when comparing newly received echoes with the echoes of fill level envelope curves already stored, often allocation problems arise because the presently received echoes can change over time although they are always caused by the same reflection position in the container. Such problems arise for example from dust formation during filling, or from the bulk material subsequently sliding down during the process of emptying bulk containers.

However, in order to ensure safe fill level metering it is necessary for a fill level that has been recognized to be time and again recognized anew on the basis of the presently received echoes, rather than a noise reflection mistakenly being assessed as being representative of the fill level. For example, if a fill level echo temporarily cannot be acquired, this must be detected so as to prevent any allocation in which for example a parasitic echo is identified as the fill level echo. This frequently problematic allocation of echoes from past fill level envelope curves to data of a present fill level envelope curve usually takes place in that data of present echoes are compared with data of already received echoes. If in such a comparison, for example using a threshold value curve or a maximum search, a present echo corresponds to an already received echo, it is assumed that these echoes correspond to each other, as a result of which the new echo is identified as the useful echo. If the number of echoes received in an already received fill level envelope curve is different from the number of present echoes, then there is the danger of allocation errors occurring. There is also the danger of misallocation if several echoes occur in a narrow range.

Feedback of the parasitic echo storage to signal processing itself constitutes a basic problem in fully automatic parasitic echo storage. If a sensor were erroneously archive the present fill level as a parasitic echo, it would no longer be possible for the subsequently running classification algorithms to identify the correct fill level.

In the use of static parasitic echo storage, problems are always encountered if parasitic echoes appear anew, for example as a result of the bulk material caking to the container walls, or if previously known parasitic echoes disappear, for example by caking falling off. Hitherto known methods for echo evaluation with the use of a parasitic echo storage device are not capable of supplementing newly created parasitic echoes, nor are they capable of removing disappeared parasitic echoes from the parasitic echo storage device.

In the case of static fill level ratios, those methods which do not use a parasitic echo storage device (for example the method described in DE 42 34 300 A1) in order to carry out a classification into useful echoes and parasitic echoes in conjunction with direct analysis of echo movements are unable to classify existing echoes into useful echoes and parasitic echoes. The advantages of such algorithms are thus limited to periods of time during which the container to be measured is being filled or emptied.

SUMMARY OF THE INVENTION

There may be a need to provide a method or other options to overcome the above-mentioned weak points of the hitherto known methods for storing parasitic echoes. In particular, there may be a need for a method which makes it possible to automatically and independently initialize the parasitic echo storage device of a fill level meter operating according to the pulse-runtime method, such as for example a radar fill level meter or an ultrasound fill level meter, and to carry out dynamic updating of the parasitic echo storage device.

According to a first exemplary embodiment a method for dynamically updating the parasitic echo storage device of a fill level meter operating according to the runtime method is provided, in which method the parasitic echo storage device is updated with parasitic echo data when previously for a parameterisable period of time a useful echo (true echo) has been identified as such due to the location-dynamic behaviour of its echo characteristics, in that the parasitic echoes (false echoes), recognized due to the static behaviour of their typical echo characteristics for the same period of time, are used for updating the parasitic echo storage device.

According to a further exemplary embodiment of the invention a fill level meter is provided, operating according to the runtime method with an evaluation unit, which fill level meter then updates the parasitic echo storage device with parasitic echo data when previously with the use of the evaluation unit for a parameterisable period of time a useful echo has been identified as such due to the location-dynamic behaviour of its echo characteristics, in that said fill level meter uses the parasitic echoes, recognized due to the static behaviour of their typical echo characteristics for the same period of time, for updating the parasitic echo storage device.

According to a third exemplary embodiment of the invention, an evaluation device for dynamically updating the parasitic echo storage device of a fill level meter operating according to the runtime method is provided, which evaluation unit then updates the parasitic echo storage device with parasitic echo data when previously for a parameterisable period of time a useful echo has been identified as such due to the location-dynamic behaviour of its typical echo characteristics, in that said evaluation device uses the parasitic echoes, recognized due to the static behaviour of their echo characteristics for the same period of time, for updating the parasitic echo storage device.

Furthermore, according to another exemplary embodiments of the present invention a computer program as well as a corresponding computer program product for dynamically updating the parasitic echo storage device of a fill level meter operating according to the runtime method is provided, in that the computer program comprises instructions which identify parasitic echoes as such due to the static behaviour of their echo characteristics, so as to subsequently update the parasitic echo storage device with the corresponding parasitic echo data. In particular, the computer program may comprise instructions for updating the parasitic echo storage device with parasitic echo data when said computer program previously, for a parameterisable period of time, has identified a useful echo as such due to the location-dynamic behaviour of its typical echo characteristics, in that said computer program uses the parasitic echoes, recognized due to the static behaviour of their echo characteristics for the same period of time, for updating the parasitic echo storage device.

For example, the starting point of the present invention may be an echo curve scanned and recorded by analog-digital conversion. In this method, recording of the reflected echo curve may be performed by processing ultrasound pulses or radar pulses periodically transmitted by the fill level meter in the direction of the medium to be measured. After this first method-related step the received echo curve may be available in digital form, for example with the dimensions of location, age and amplitude, for processing by a microprocessor or microcontroller. After this analog-digital conversion, the amplitudes of the echoes of the fill level envelope curve may be stored, depending on location and age, in a two-dimensional array or in a matrix. In the case of the three acquired dimensions of location s, amplitude A and age t, a certain amplitude A may be allocated to each age t and each location s, i.e. $A(t,s)$. If one or several further dimensions are acquired by the acquired echo, such as for example a pressure or another physical characteristic, then the echo data may be stored accordingly in a four-dimensional or multi-dimensional array, or in a tensor. In the case of an echo with the dimensions of location s, amplitude A, age t, and, for example, pressure p, this would mean that a particular amplitude A and a particular pressure p may be associated with each echo age t and each location s.

$$t, s \rightarrow A, p$$

The size of the array into which the echo data is written in this method may be here variable and may be dynamically adapted by the method to various parameters such as for example fill speed or size of the time window. However, it may be possible to show that it is be suitable to record in the array for further evaluation two to 20 echo curves of different ages or the associated echo characteristics. Good results may be obtained with an array size of approximately 10 echo curves. In particular, it may be possible to show that it is advantageous to work with an array size of 5 echo curves of different ages, wherein also any other desired sizes can be considered.

To be able to implement the method presented so as to optimize storage space, it may be expedient to first extract individual echoes from the echo curves obtained in the first step, and to store these together with their typical echo characteristics such as for example age t, location s and amplitude A, instead of storing the entire echo curve.

After the echo curves or their respective associated typical echo characteristics have been stored as described above, the echoes of the stored echo curves of different ages may be allocated to global echo groups with identical reflection origin. Such allocation to global echo groups can take place in one step, preferably however in several steps, which may ensure more reliable allocation of the respective echoes to the respective global echo groups with identical reflection origin. As part of the allocation of echoes of different ages to global echo groups, it may for example possible to first merge corresponding echoes of echo curves of various echo ages using correlated typical echo characteristics to form local echo groups of identical reflection origin.

Subsequently, these correlated echoes of the local echo groups may then be allocated to the corresponding global echo groups of identical reflection origin, again using corresponding correlated typical echo characteristics. To update the global echo groups in this process, for example the oldest echoes of the local echo groups may be taken over into the corresponding global echo groups, wherein it may be of course also possible not only to transpose the oldest echoes of the local echo groups to the corresponding global echo groups, but also to transpose sub-groups of the local echo groups to the corresponding global echo groups.

After the global echo groups have been updated in the way described, the echoes which have been merged (collected) to form global echo groups may be analysed in relation to changes over time in their echo typical characteristics. In this analysis it may be for example possible to examine changes over time in the echo locations or echo amplitudes, as well as associated maximum, minimum or average values, or any changes in the form of individual echoes. To further improve the reliability of the analysis in relation to local shifts, the number of the echoes archived in the global echo groups may be preferably large. In this context it may be advantageous to archive s echoes in the global echo groups, wherein $s \in [20; 100]$. Of course if the respective processing capacity is available it may also possible to archive and further process more than 100 echoes in the global echo groups. However, good results may be achieved with a global echo group in which approximately 50 or 55 echoes are stored. By keeping the number of echoes archived in the global echo groups large, a situation may be achieved in which random echo shifts, caused by noise, may not lead to misinterpretation in relation to any time-related echo shift. Furthermore, to further improve the reliability of the analysis in relation to local echo displacement, it may be advantageous if one-dimensional or multi-dimensional signal processing methods such as, for example, filtering, averaging, selection or other methods of digital image processing are used in the analysis.

By evaluating the previously obtained analysis results, in a further process step the global echo groups may be then classified into location-dynamic and location-static echo groups. In this process, for example, those global echo groups where the local shift of the associated echoes exceeds a parameter-dependent minimum local shift may be identified as location-dynamic echo groups. Of these echo groups, which are recognized as location-dynamic, it may be then for example possible to identify the echo group in closest proximity as being the one that represents the fill level. All other global echo groups may be then be classified as representing parasitic echoes.

When in this way the global echo groups, and in particular the global echo groups which represent parasitic echoes, have been updated, finally, the parasitic echo storage device of the fill level meter may be updated depending on the results of the previously completed classification. According to the invention, only parasitic echoes which are located between the fill level meter and the useful echo may be updated in the storage device.

The method presented above may be thus in a position to independently update the parasitic echo storage device of a fill level meter according to the results of the classification. Initiating an update of the parasitic echo storage device may, for example, take place when during analysis of the global echo groups a maximum permissible pre-settable change in an echo has been detected in relation to amplitude or location. In this updating cycle of the parasitic echo storage device, for example the echo with pronounced change in location, which echo may be situated in closest proximity to the fill level meter, may be declared to be the useful echo. Conversely, the remaining echoes whose position is between the fill level meter and the present useful echo may be declared as being parasitic echoes. If the described classification is sufficiently stable, the method may transfer the knowledge of the measuring situation, gained in this way, to the parasitic echo storage device of the fill level meter. However, if due to a lack of movement in the echo locations no classification into useful echoes and parasitic echoes has taken place, or if time-related evaluation does not result in any static classification results, then the parasitic echo storage device may not be updated. In this way, enhanced safety in relation to the possibility of erroneous parasitic echo storage may be achieved.

A corresponding fill level meter as well as a separate evaluation device for dynamically updating the parasitic echo storage device of the fill level meter, which evaluation device updates the parasitic echo storage device with parasitic echo data that previously were identified as such according to the method described above, may comprise an evaluation unit with a storage device in which a predeterminable number of fill level envelope curves with the dimensions of location, time and amplitude may be archived. Furthermore, the evaluation unit of the fill level meter or of the evaluation device may comprise a microprocessor which—by means of certain mathematical algorithms, which will be described in more detail below, and with the use of one-dimensional or multi-dimensional signal processing methods—may undertake the allocation of the echoes of the stored echo curves of various ages to the global echo groups of identical reflection origin, and then analyses and classifies the allocated echoes according to the method according to an exemplary embodiment of the invention, and finally in this way updates the parasitic echo storage device.

A corresponding computer program for dynamically updating the parasitic echo storage device of the fill level meter may carry out the method according to the invention; it may, for example, implemented as a sub-routine in an evaluation program for evaluating generated envelope curves. Such evaluation programs are for example known by the trademark of Echofox® of VEGA Grieshaber KG, Germany. Correspondingly, the method according to the invention and the correspondingly operating computer program can either be implemented in a separate evaluation device or, if desired, can be integrated directly in a fill level meter.

It should be noted that the term "comprising" does not exclude other elements or steps and the "a" or "an" does not exclude a plurality. Also elements described in association with different embodiments may be combined.

BRIEF DESCRIPTION OF THE DRAWINGS

Below, for further explanation and to provide a better understanding of the present invention, one embodiment of the invention is described in more detail with reference to the enclosed drawings.

FIG. 8 shows an extract from an array for echo storage;

FIG. 10 shows a table for explaining the combinatorial determination of local echo groups;

FIG. 11 shows several global echo groups in tabular form;

FIG. 13 shows an extract from a parasitic echo storage device array.

In all drawings, identical equipment, units and process steps are designated by corresponding reference characters.

DESCRIPTION OF AN EXEMPLARY EMBODIMENT OF THE INVENTION

Figure 1:
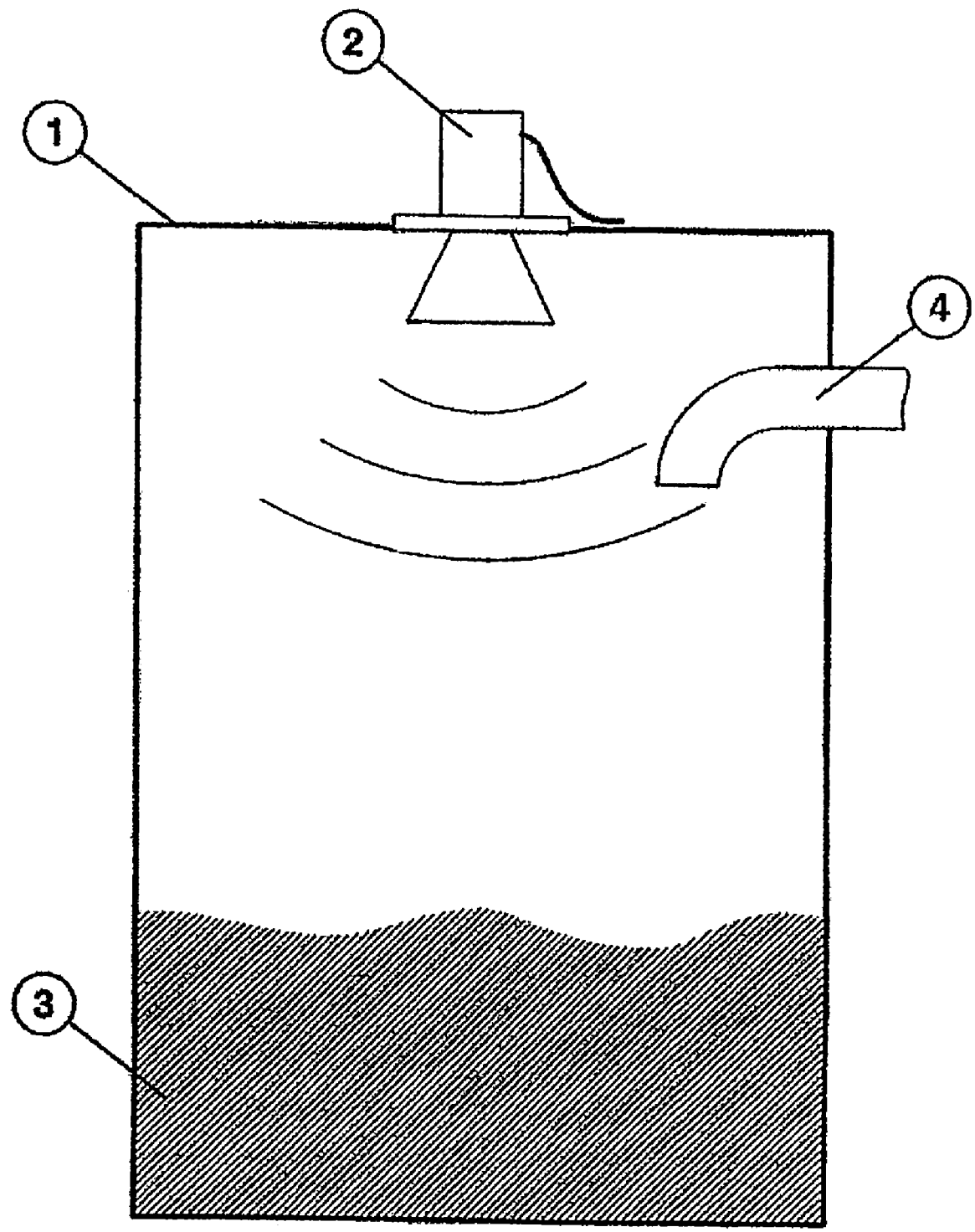
FIG. 1 shows a lateral view of a fill level metering station with a non-contacting fill level meter.

FIG. 1 shows a typical application for using the method according to the invention. The fill level meter 2, installed in the cover region of a container 1, continuously transmits individual pulse packets in the direction of the medium 3 to be measured. The emitted waves are reflected both by the medium 3 to be measured and by the objects 4 built into the container, and are received again by the fill level meter 2. The fill level meter 2 itself comprises several individual components which in their interaction provide a device suitable for implementing the method according to the invention.

Figure 2:
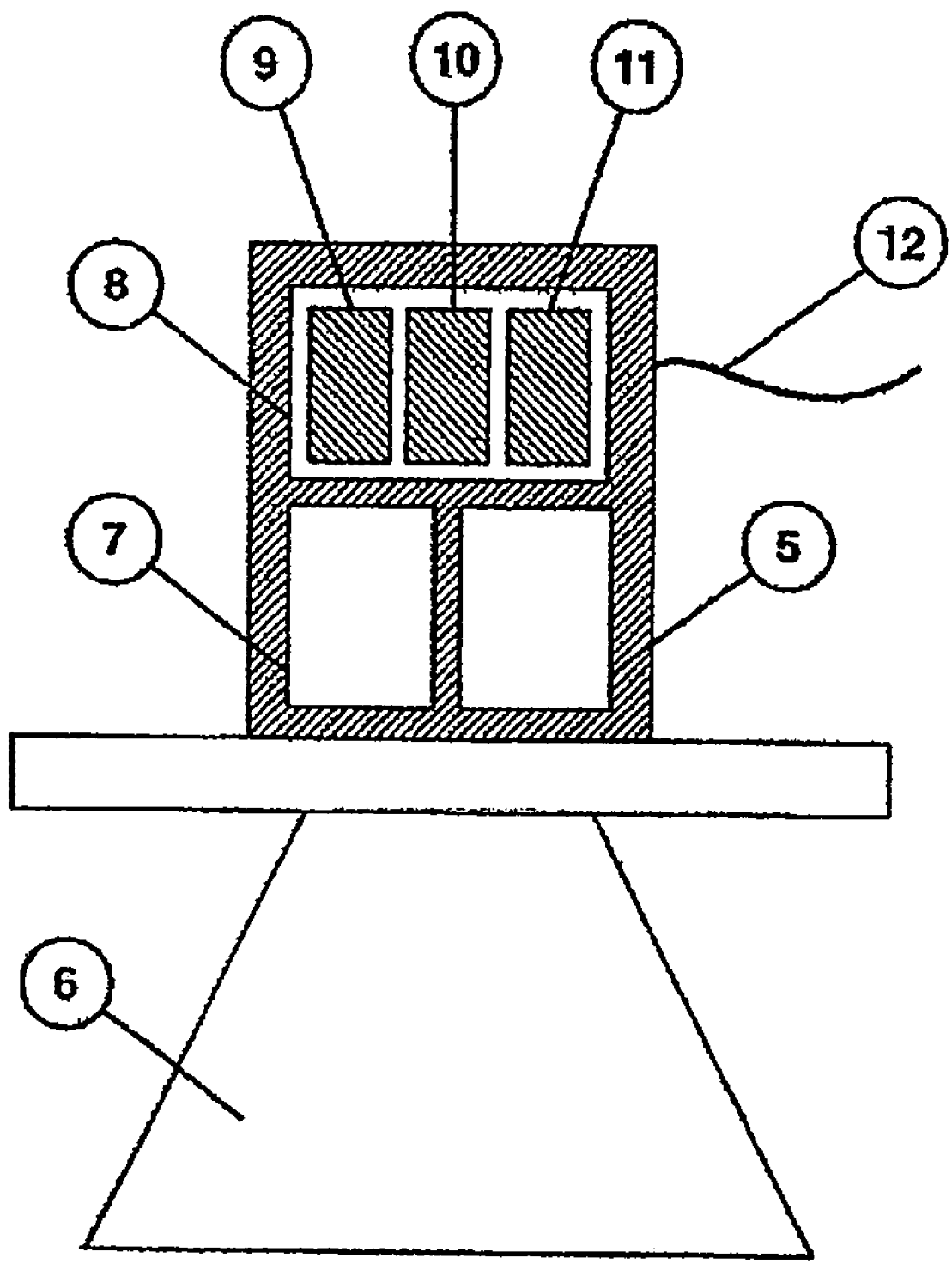
FIG. 2 shows a diagrammatic lateral view of a fill level meter.

FIG. 2 shows the basic design of a fill level meter 2 with which the method according to the invention can be carried out. A radar pulse or ultrasound pulse generated by a transmitting device 5 is emitted by way of the aerial 6 of the fill level meter 2 in the direction of the medium 3 to be measured. The signal fractions reflected by the medium 3 and by other installations 4 are received by the aerial 6 after a distance-dependent runtime (interval between pulse and echo-return), and are transmitted to a receiving and processing unit 7. Within the receiving and processing unit 7 the signals are demodulated if necessary and are then in a known way amplified, filtered and transformed to binary representation by means of an analog-digital converter.

The digitalized echo curve obtained in this way is finally archived in a volatile memory 9 of an evaluation unit 8. The evaluation unit 8 analyses the transferred echo envelope curve and from it determines the present position of the medium 3 to be measured. The results of the analysis can then be made available to a higher-order control system by means of a communication connection 12, such as for example a 4-20 mA line.

Figure 4:
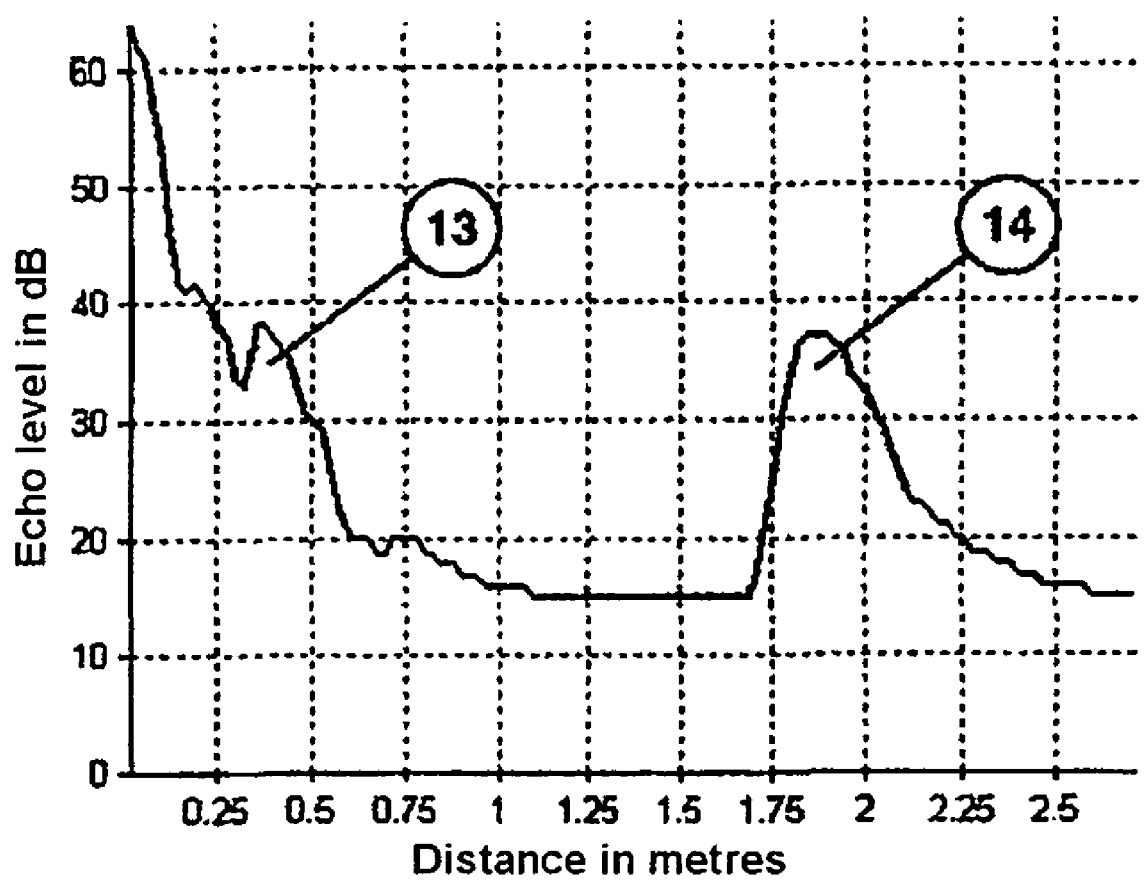
FIG. 4 shows a graphic representation of a digitized echo curve of a fill level meter with physical units.

The analysis according to the invention, which is to be carried out by the evaluation unit 8, starts with the digitized echo curve provided by the receiving and processing unit 7. FIG. 4 shows an example of such a digitized echo envelope curve as it is generated in an application according to FIG. 1. As can be seen in FIG. 4, the echo curve shown has two echoes 13, 14 which are clearly visible. The first echo 13, at approximately 0.35 m, is caused by reflection of the emitted pulse on the pipeline 4 shown in FIG. 1. The evaluation unit 8 should therefore recognize this echo as a parasitic echo. The second, large, echo 14 is at a distance of 1.80 m; it is caused by reflection from the bulk material (contents) 3.

Figure 5:
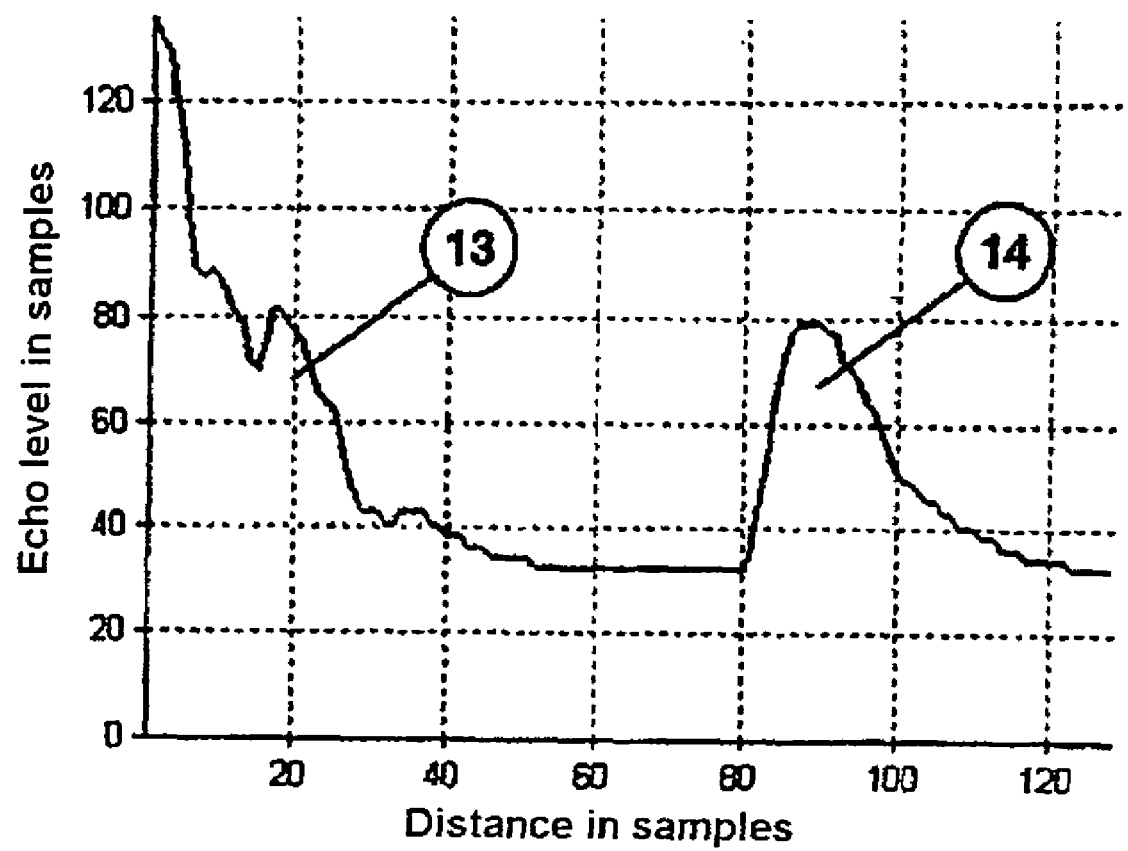
FIG. 5 shows an echo curve of a fill level meter without units.

The echo curve used in the following example is shown in FIG. 5. The echo curve essentially corresponds to the echo curve shown in FIG. 4, except that the echo curve in FIG. 5 has the non-dimensional values that are customary in the fill level meter.

Figure 6:
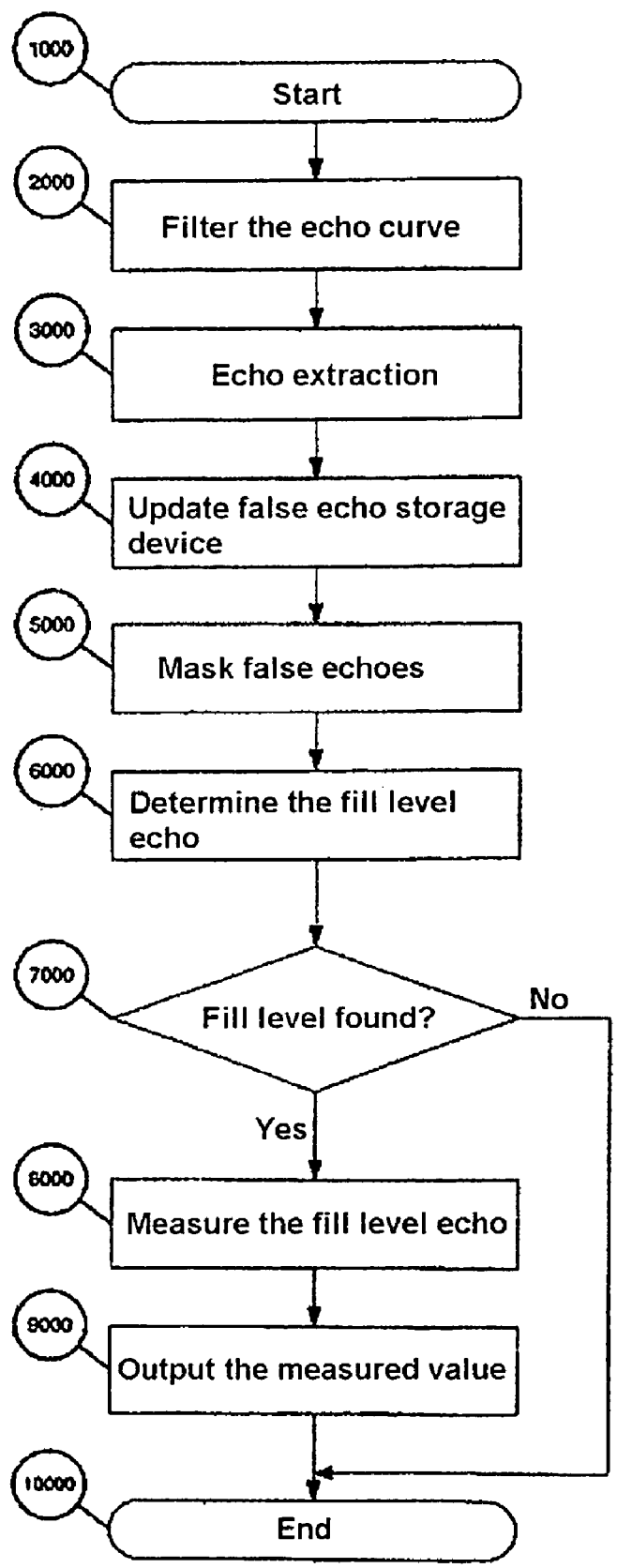
FIG. 6 shows a flow chart explaining a fill level metering method.

Apart from the volatile memory 9 the evaluation unit 8 comprises a non-volatile storage unit 10 as well as a processor unit 11 for implementing the method according to the invention. The calculation specifications archived in the non-volatile storage device 10 are explained in more detail in the flow chart shown in FIG. 6.

Figure 3:
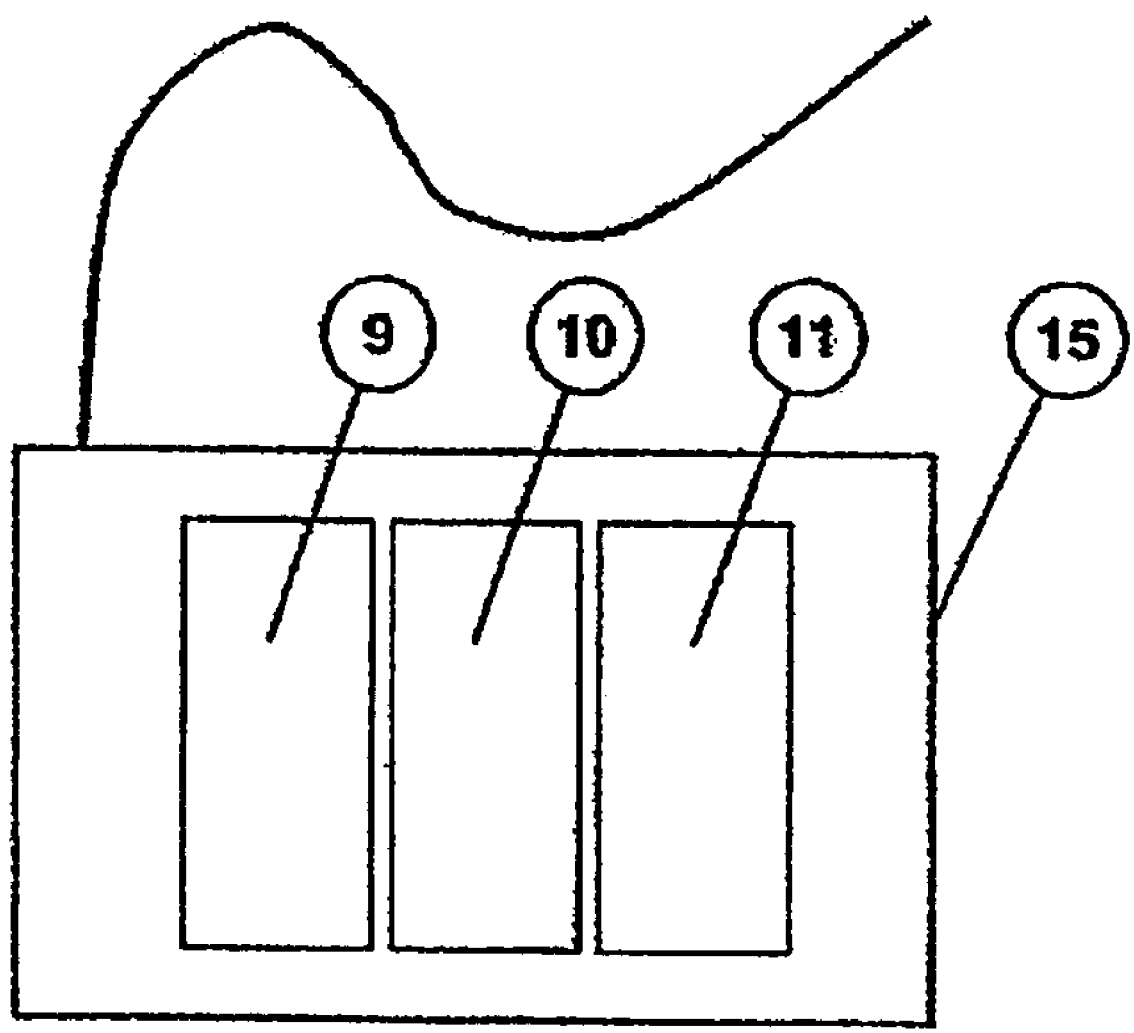
FIG. 3 shows a diagrammatic lateral view of an evaluation device.

Instead of evaluating the echo curves in the evaluation unit 8 of the fill level meter 2 it is of course also possible to carry out the evaluation with the use of the evaluation device 15 shown in FIG. 3. FIG. 3 shows a diagrammatic representation of an evaluation device 15 which, by applying the method according to the invention, assesses and evaluates the echoes received by the fill level meter 2 of FIG. 1. To this effect the evaluation device 15, analogously to the fill level meter 2, comprises a volatile memory 9, a non-volatile storage unit 10 as well as a processor unit 11. Unlike the fill level meter of FIG. 2, the evaluation device 15 can be in a location other than directly on a container and is therefore suited to simultaneously evaluate fill level envelope curves of several fill level meters.

At the beginning of the method the echo curve archived in the volatile memory 9 is filtered by means of a one-dimensional or multi-dimensional signal processing method, for example to suppress noise fractions contained therein. From the filtered envelope curve obtained in this way, subsequently in step 3000 typical echo characteristics of the echoes contained therein are extracted. The methods used therein for example first calculate a dynamic threshold which follows the principal curve course (gradient). After the typical echo characteristics such as for example the echo location s and the echo amplitude A have been determined, the echoes contained in the echo curve, which echoes are above this threshold value, are taken over into a temporary echo storage device.

In step 4000, on the basis of the echo characteristics collected so far, an attempt is made to update the parasitic echo storage device of the fill level meter 2. The process steps used in this are described in detail below. Information contained in the parasitic echo storage device is subsequently used to remove known parasitic echoes (false echoes) from the present echo table. From the remaining echo data, taking into account the echo amplitude, in step 6000 an attempt is then made to determine the echo that really belongs to the fill level information. If such an echo can be identified, it is precisely measured with the use of the echo curve that exists in the storage device, so as to determine the exact position of the top surface of the contents. In step 9000 the measured value obtained is then transferred to a higher-order communication device (not shown), such as for example a process control station.

Figure 7:
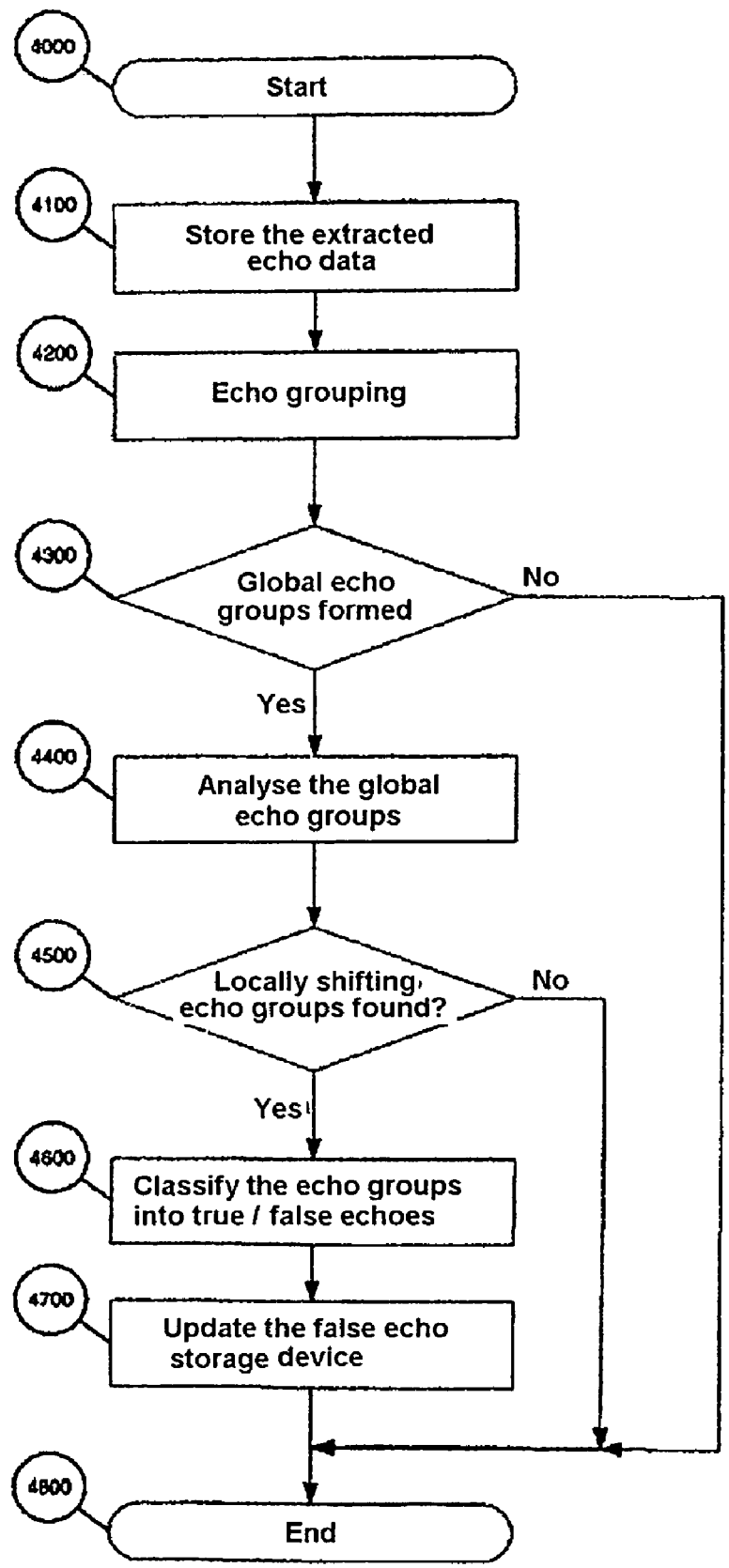
FIG. 7 shows a flow diagram explaining updating, according to the invention, of the parasitic echo storage device.

Updating the parasitic echo storage device, carried out in step 4000, includes the actual main focus of the present invention. FIG. 7 shows the associated flow chart. In step 4100, first of all temporarily stored echo characteristics are taken over in the echo storage unit shown in FIG. 8. Apart from the extracted echo characteristics of the present echo curve, the array shown also includes the echo characteristics of the echoes of the past five recordings. The echo age t entered in column 2 indicates the number of measurements that have been carried out since the extraction of the present echo curve. Consequently, an echo age t of 2 indicates that the associated echo characteristics originate from the penultimate measurement.

Figure 9:
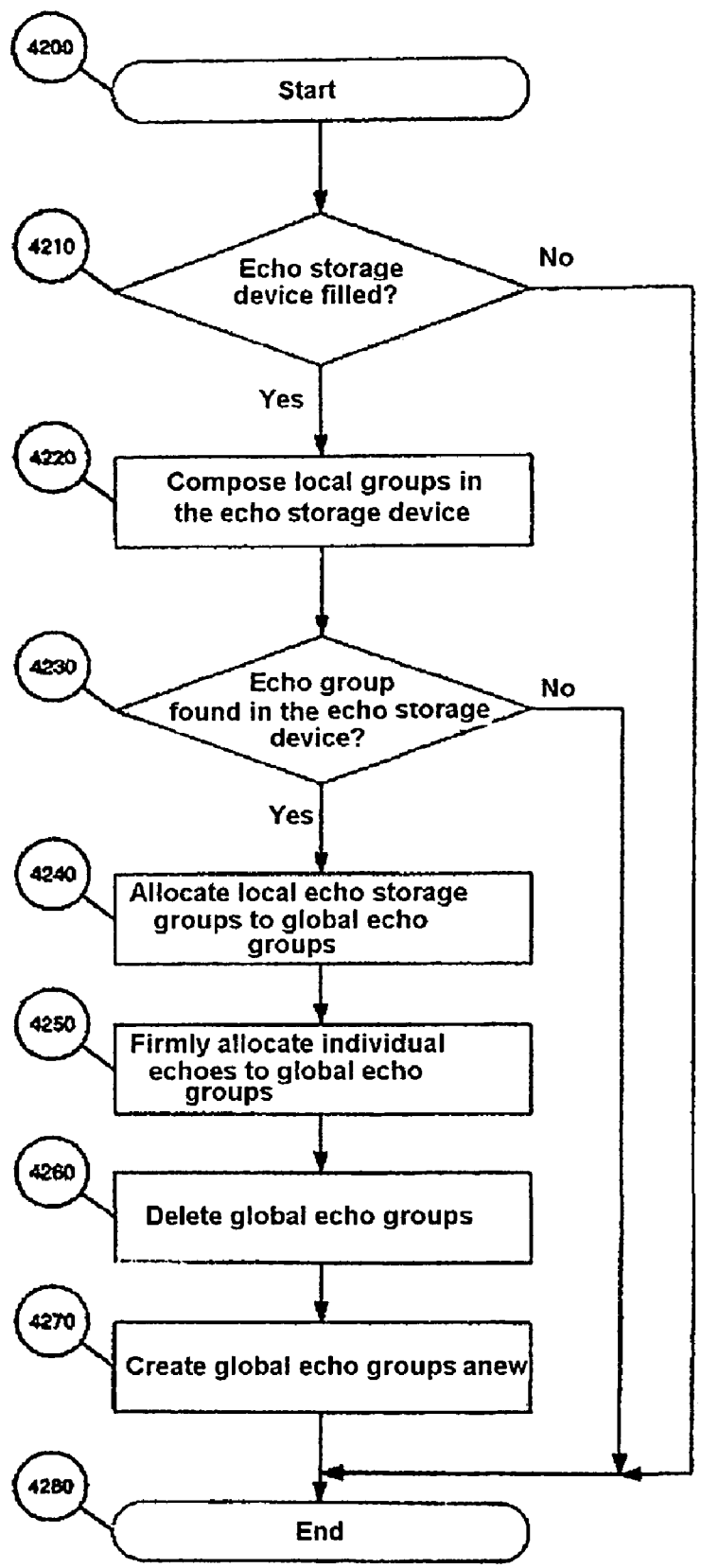
FIG. 9 shows a flow chart for explaining echo grouping.

After the echo characteristics have been taken over in the echo storage device, in step 4200 an attempt to group the echoes contained in the echo storage device is made. The aim of such grouping is to compose the echoes, caused in each instance by the same reflection origin, of various measurements (in other words of echo curves of different ages) so as to form (global) groups. The allocation method applied in this process is explained in more detail in FIG. 9.

On condition that the echo storage device (4210) is completely full, as shown in FIG. 8, in a first step 4220 the echoes contained in the echo storage device are composed to form local groups. Only in a second step 4240, on condition that it was possible to identify local echo groups in the echo storage device (4230), is an attempt made to bring the locally found echo groups into a logical connection with the global echo group found in the past. In other words an echo is only supplemented to form an existing global echo group if further echoes exist which form a local group with the first echo. This prevents erroneous allocation of a single echo, for example an echo randomly generated by noise, to the global echo groups. This method returns clearly improved results when compared to the results obtained by direct allocation of individual echoes to echo groups found in the past.

For the purpose of forming the local groups (step 4220) for example the echoes of different ages i, j can combinatorially be compared and correlated with each other. For each resulting combination option it is for example possible to calculate an evaluation number, taking into account the difference in age of the respective echoes, the amplitude difference and the respective local deviation. By means of the evaluation numbers resulting in this way, unambiguous allocation of individual echoes to form groups can be carried out, as graphically shown in FIG. 10. The evaluation number between an echo i and echo j can for example be calculated using the following equation:

$$\text{Evaluation number } (i, j) = \max\{1, abs[(EA(i)-EA(j))*(EO(i)-EO(j))*(EAmp(i)-EAmp(j))]\},$$

wherein:
EA (i) Age of echo i,
EA (j) Age of echo j,
EO (i) Location of echo i,
EO (j) Location of echo j,
EAmp(i) Amplitude of echo i,
EAmp(j) Amplitude of echo j,
i≠j^EA(i)≠EA(j)
i, j=A . . . L.

The evaluation numbers resulting from the echoes of FIG. 8 are shown in the table of FIG. 10. The calculation instruction mentioned above is only one example of possible implementation. Of course other combinations or weighting of the stated values can be selected, depending on the parameters.

Based on the table of evaluation numbers shown in FIG. 10, for each of the defined echoes (column 1 of the table) the corresponding group partner, i.e. the corresponding echo from an echo curve of a different age, is determined. This corresponding echo is characterised by a minimum evaluation number in the corresponding line. Consequently, the following groups result in the above example:

AC BD CE DF EG FH GI HJ IK JL

According to the rules of the theory of sets, these subgroups can be collected to form larger (local) echo groups. Finally, the following local echo groups result:

ACEGIK BDFHJL

If the formation of local echo groups, as shown in the above example, within the echo storage device was successful (query in step 4230), then in step 4240 an attempt is made to combine these local echo groups with the global echo groups that were found in previous runs. The global echo groups contain the information of echoes that belong together across a depth of 50 recordings (cf. FIG. 11), wherein of course other depths can also be realized. Allocation between the local echo groups in the echo storage device and the global echo groups can again take place by a combinatorial comparison, taking into account the criteria of "amplitude deviation" and "local deviation", wherein for calculating the local deviation, only the latest entry of the global echo group storage device and the oldest entry of the local echo group storage device are used, wherein of course, again, other criteria are possible. In contrast to this, comparing the characteristic of amplitude deviation between the local and the global echo groups takes place with the use of the respective average amplitudes of both groups. For example, in the case of undesirable noise influence this results in more stable processing of the method where sudden amplitude changes occur. Analogous to the method shown in FIG. 10, again an evaluation number between a local echo group m and a global echo group n can be formed:

$$\text{Evaluation number } (m, n) = \max\{1, abs[(DAmp(m)-DAmp(n))*(ELocation(m)-ELocation(n))]\},$$

wherein:
DAmp(m) Average amplitude of the local echo group m
DAmp(n) Average amplitude of the local echo group n
ELocation(m) Echo location of the oldest element of the local echo group m
ELocation(n) Echo location of the oldest element of the local echo group n On completion of calculating the evaluation number the global echo group n is supplemented by the oldest echo of the corresponding local echo group m or even by the entire local echo group which has returned the lowest evaluation number when compared to the others.

The connection between local and global echo groups is not established rigidly but instead dynamically; it only applies to the present run of the method. Therefore in step 4250 the oldest entries of the local echo groups are taken over corresponding to the present allocation, into the table of the associated global echo group. In step 4260 global echo groups that after a parameter-dependent time were unable to carry out an enlargement by allocation to a local group are deleted. In practical application this case always occurs if an echo which has been present up to this time and which was represented by this group suddenly disappears, for example if the useful echo is lost or if caking (on the container wall) disappears.

On the other hand it is also possible that locally found echoes or echo groups cannot be allocated to any global echo group. In step 4270 these local echo groups are established as new global groups. In practical use this case always occurs if a new echo arises, for example if caking of contents occurs on a container wall.

Figure 12:
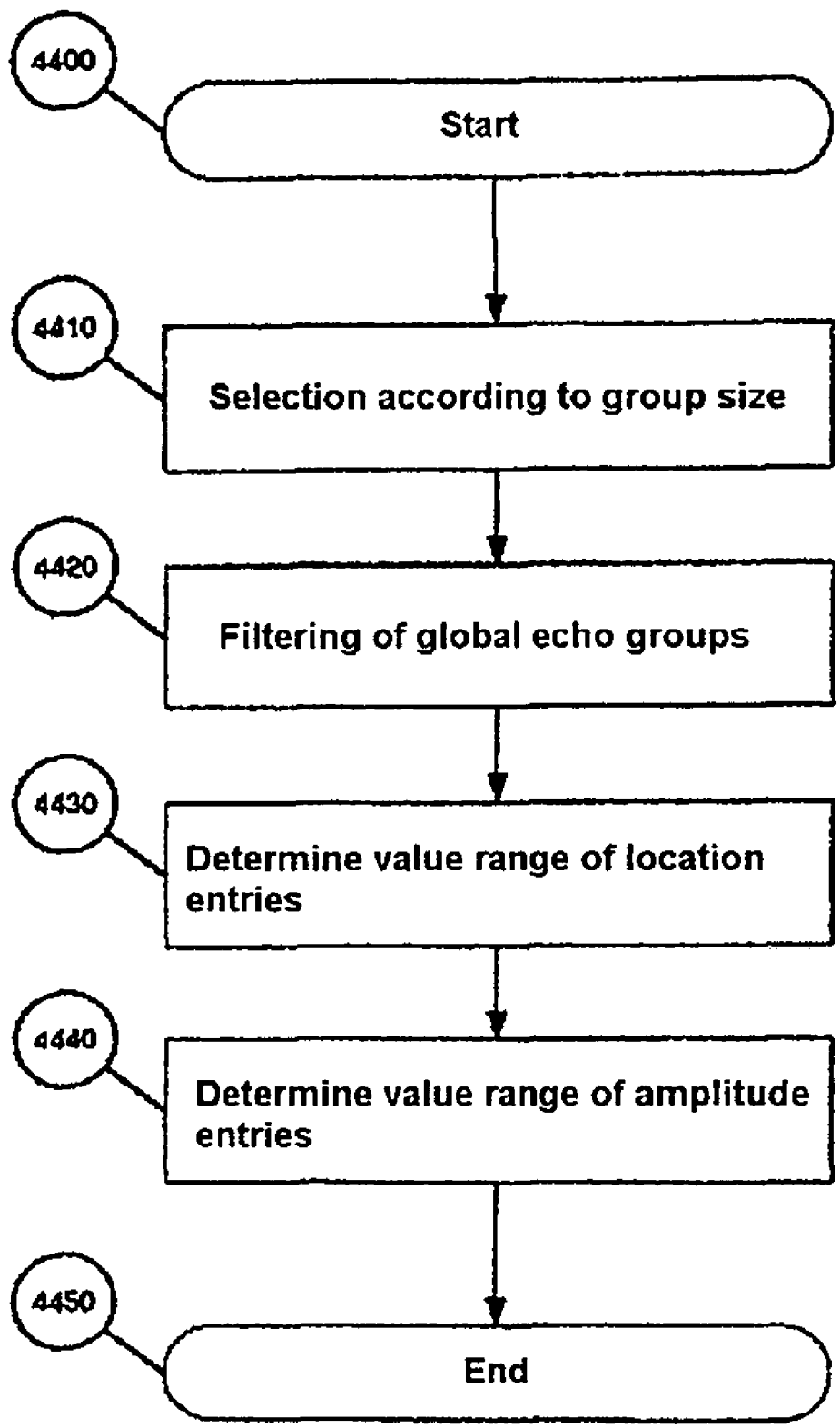
FIG. 12 shows a flow chart explaining the analysis of the global echo groups.

On completion of the global echo group calculation, in step 4400 of FIG. 7 the found global echo groups are examined more closely. The examination aims to detect local changes in sufficiently large global echo groups. In this process the analysis is carried out in the method-related steps shown in FIG. 12. In order to ensure the reliability of the results, only those echo groups are used for further examination which reach a parameterisable minimum size.

In other words, only those echo groups are investigated whose appearance has already been observed for some time.

These echo groups can then be filtered in relation to location as well as in relation to amplitude using one-dimensional or multi-dimensional signal processing methods, such as for example filtering, averaging, selection and classification. In the case of averaging, for example the location entries and/or amplitude entries of the global echo groups are viewed as a digital signal and are smoothed by settling with adjacent entries. Individual freak values relating to location and amplitude can be effectively suppressed by this measure. Finally, in respect of each echo group of sufficient size the minimum and maximum entries in the categories of location and amplitude are determined and archived in a separate table.

If in at least one of the examined global echo groups a parameter-dependent minimum location shift of the associated echoes is observed, then in step 4600 of FIG. 7 the sufficiently large echo groups are divided into location-dynamic and location-static echo groups. According to the underlying calculation instructions, all those echo groups of sufficient size whose location shift is larger than a parameter-dependent minimal location shift are location-dynamic echoes. The location-dynamic echo that is situated in closest proximity to the fill level meter is then recognized as the fill level echo. Parasitic echoes can thus only be detected in the region between the fill level meter and the present fill level. Consequently, from among the remaining echo groups all those echo groups are declared to be parasitic echoes whose location shift is smaller than a parameterisable maximum permissible parasitic echo location shift and whose amplitude scatter is smaller than the also parameterisable maximum permissible disturbance amplitude scatter.

In step 4700 the parasitic echo information determined with the above mentioned method is used to update the parasitic echo storage device of the fill level meter. To this effect, the average position and the average amplitude are calculated in relation to each global echo group that was identified as a parasitic echo, and are entered into the parasitic echo table of the parasitic echo storage device, as is shown in FIG. 13. Obsolete entries in the parasitic echo storage device, which entries are from the region between the fill level meter and the present fill level, are also deleted where appropriate.

It should also be noted that reference signs in the claims shall not be construed as limiting the scope of the claims.

The invention claimed is:

1. A method for dynamically updating a parasitic echo storage device of a fill level meter operating according to a runtime method, the method comprising:
   identifying a useful echo as such due to the location-dynamic behaviour of its typical echo characteristics for a parameterisable period of time;
   recognizing a parasitic echoes due to the static behaviour of their typical echo characteristics across the same period of time;
   updating the parasitic echo storage device with the parasitic echo data when the useful echo has been identified for the parameterisable time period;
   recording an echo curve reflected from a medium to be measured;
   storing at least two of the recorded echo curves of different ages;
   allocating the echoes of the stored echo curves of different ages to global echo groups of identical reflection origin;
   analysing the echoes, which have been merged to form global echo groups, in relation to changes over time of their typical echo characteristics;
   classifying the global echo groups depending on the previously obtained analysis result into useful echoes and parasitic echoes; and
   updating the parasitic echo storage device of the fill level meter depending on the result of the classification.

2. The method according to claim 1, wherein recording of the reflected echo curve takes place by processing the ultrasound pulses or radar pulses that are periodically emitted by the fill level meter in the direction of the medium to be measured.

3. The method according to claim 1, the method comprising:
   storing the recorded echo curves based on their associated typical echo characteristics.

4. The method according to claim 1, the method comprising: examining a change over time of at least one of the typical echo characteristics from the group of echo characteristics consisting of local shift of the echo, change in shape and change in amplitude, during analysing of the respective echoes merged to form global echo groups.

5. The method according to claim 1, the method comprising:
   using one-dimensional or multi-dimensional signal processing methods for detecting changes over time during analysing.

6. The method according to claim 5, the method comprising:
   applying methods of one-dimensional or multi-dimensional signal processing from among the group of methods of signal processing consisting of filtering, averaging, selection and classification during analysing.

7. The method according to claim 1, wherein the allocation of the echoes of various ages to form global echo groups takes place in at least two steps.

8. The method according to claim 7, the method comprising a first step of:
   merging corresponding echoes of echo curves with a different echo age, on the basis of correlated typical echo characteristics, to form local echo groups of identical reflection origin.

9. The method according to claim 8, wherein the echoes of a number of r echo curves of different ages are merged to form local echo groups, wherein r ∈ [2; 10] applies.

10. The method according to claim 8, the method comprising a second step of:
    allocating at least the oldest echoes of the local echo groups to the corresponding global echo groups of identical reflection origin on the basis of correlated typical echo characteristics.

11. The method according to claim 10, wherein the global echo groups comprise a maximum of s echoes, wherein s ∈ [20; 100] applies.

12. The method according to claim 1, the method comprising:
    deleting an existing global echo group if, after a parameterisable number of echo curves, no allocation of echoes to the global echo group has taken place.

13. The method according to claim 1, the method comprising:
    generating a new global echo group if, after a parameterisable number of echo curves, no allocation of the echoes of the echo curves to an existing echo group has taken place.

14. The method according to claim 1, wherein updating the parasitic echo storage device takes place when during the analysis of global echo groups a change of a predeterminable magnitude of an echo has been detected in relation to amplitude or location.

15. An evaluation device for dynamically updating a parasitic echo storage device of a fill level meter operating according to a runtime method, the evaluation device comprising:
- a parasitic echo storage device,
- wherein the evaluation device is adapted to update the parasitic echo storage device with parasitic echo data when the evaluation device identified a useful echo as such due to the location-dynamic behaviour of its typical echo characteristics for a parameterisable period of time, in that said evaluation device uses the parasitic echo, recognized due to the static behaviour of their typical echo characteristics across the same period of time, for updating the parasitic echo storage device; and
- wherein the evaluation device is adapted to store at least two echo curves of different ages, which echo curves are reflected by a medium to be measured, in a storage device, and to allocate associated echoes to global echo groups of identical reflection origin in order to analyze these echoes in relation to the change over time of their typical echo characteristics, and on the basis of the results of the analysis to classify the global echo groups into useful echoes and parasitic echoes, wherein the evaluation device uses this classification result for updating the parasitic echo storage device of the fill level meter.

16. The evaluation device according to claim 15, wherein the evaluation device is adapted to store the echo curves on the basis of their associated typical echo characteristics.

17. The evaluation device according to claim 15, wherein the evaluation device is adapted to analyze the change over time in the echoes allocated to global echo groups at least in relation to a typical echo characteristic from the group of typical echo characteristics consisting of local shift of the echo, change in shape and change in amplitude.

18. The evaluation device according to claim 15, wherein the evaluation device, for detecting changes over time, is adapted to apply one-dimensional or multi-dimensional signal processing methods from the group of methods of signal processing consisting of filtering, averaging, selection and classification.

19. The evaluation device according to claim 15, wherein the evaluation device is adapted to carry out the allocation of the echoes of various ages to global echo groups in at least two steps.

20. The evaluation device according to claim 19, wherein the evaluation device is adapted to merge in a first step corresponding echoes of echo curves of different ages on the basis of correlated typical echo characteristics to form local echo groups of identical reflection origin.

21. The evaluation device according to claim 20, wherein the evaluation device is adapted to merge echoes of a number of r echo curves of different ages to form local echo groups, wherein $r \in [2; 10]$ applies.

22. The evaluation device according to claim 20, wherein the evaluation device is adapted to allocate in a second step at least the oldest echoes of the local echo groups to the corresponding global echo groups of identical reflection origin on the basis of correlated typical echo characteristics.

23. The evaluation device according to claim 22, wherein the global echo groups comprise a maximum of s echoes, wherein $s \in [20; 100]$ applies.

24. The evaluation device according to claim 15, wherein the evaluation device is adapted to delete an existing global echo group if, after a parameterisable number of echo curves, said evaluation device has been unable to allocate echoes to the global echo group.

25. The evaluation device according to claim 15, wherein the evaluation device is adapted to generate a new global echo group if, after a parameterisable number of echo curves, said evaluation device has been unable to allocate the echoes of the echo curves to an existing echo group.

26. The evaluation device according to claim 15, wherein the evaluation device is adapted to update the parasitic echo storage device when the evaluation device during analysis of the global echo groups detects a change of predeterminable magnitude of an echo in relation to amplitude or location.

27. The evaluation device according to claim 15, wherein the evaluation device is integrated in a fill level meter.

28. The evaluation device according to claim 15, wherein the evaluation device is spaced apart from a fill level meter and is connected to the fill level meter by way of a data connection.

29. A computer readable storage medium including a set of instructions executable by a processor, the set of instructions operable to:
- identifying a useful echo as such due to the location-dynamic behaviour of its typical echo characteristics for a parameterisable period of time;
- recognizing a parasitic echoes due to the static behaviour of their typical echo characteristics across the same period of time;
- updating the parasitic echo storage device with the parasitic echo data when the useful echo has been identified for the parameterisable time period;
- recording an echo curve reflected from a medium to be measured;
- storing at least two of the recorded echo curves of different ages;
- allocating the echoes of the stored echo curves of different ages to global echo groups of identical reflection origin;
- analysing the echoes, which have been merged to form global echo groups, in relation to changes over time of their typical echo characteristics;
- classifying the global echo groups depending on the previously obtained analysis result into useful echoes and parasitic echoes; and
- updating the parasitic echo storage device of the fill level meter depending on the result of the classification.

* * * * *